(12) United States Patent
Prasek et al.

(10) Patent No.: US 8,387,696 B2
(45) Date of Patent: Mar. 5, 2013

(54) DELAYED BREAKER

(75) Inventors: Bethicia B. Prasek, The Woodlands, TX (US); Raul Navarro, Aberdeen (GB); Mark Luyster, Houston, TX (US); Andrew G. K. Jones, Cape Town (ZA); LaTosha Moore, Richmond, TX (US)

(73) Assignee: M-I L.L.C., Houston, TX (US)

( * ) Notice: Subject to any disclaimer, the term of this patent is extended or adjusted under 35 U.S.C. 154(b) by 212 days.

(21) Appl. No.: 12/670,784

(22) PCT Filed: Jul. 31, 2008

(86) PCT No.: PCT/US2008/071740
§ 371 (c)(1),
(2), (4) Date: May 26, 2010

(87) PCT Pub. No.: WO2009/020829
PCT Pub. Date: Feb. 12, 2009

(65) Prior Publication Data
US 2010/0270017 A1    Oct. 28, 2010

Related U.S. Application Data

(60) Provisional application No. 60/953,795, filed on Aug. 3, 2007.

(51) Int. Cl.
*E21B 43/22* (2006.01)
(52) U.S. Cl. .................. 166/300; 166/281; 166/307
(58) Field of Classification Search ................. None
See application file for complete search history.

(56) References Cited

U.S. PATENT DOCUMENTS

| | | | |
|---|---|---|---|
| 3,785,438 A | 1/1974 | Jackson et al. |
| 3,872,018 A | 3/1975 | Alexander |
| 4,561,985 A | 12/1985 | Glass, Jr. |
| 5,226,479 A | 7/1993 | Gupta et al. |
| 5,238,065 A | 8/1993 | Mondshine et al. |
| 5,437,331 A | 8/1995 | Gupta et al. |
| 5,678,632 A | 10/1997 | Moses et al. |
| 5,783,527 A | 7/1998 | Dobson, Jr. et al. |
| 5,813,466 A | 9/1998 | Harris et al. |
| 6,702,023 B1 | 3/2004 | Harris et al. |
| 6,763,888 B1 | 7/2004 | Harris et al. |
| 6,818,594 B1 | 11/2004 | Freeman et al. |
| 6,861,394 B2 | 3/2005 | Ballard et al. |
| 6,877,563 B2 | 4/2005 | Todd et al. |
| 6,986,391 B2 | 1/2006 | Funkhouser et al. |
| 7,195,068 B2 | 3/2007 | Todd |
| 2005/0261138 A1 | 11/2005 | Robb et al. |
| 2006/0278389 A1 | 12/2006 | Ayoub et al. |
| 2007/0087940 A1 | 4/2007 | Qu et al. |

FOREIGN PATENT DOCUMENTS

| | | |
|---|---|---|
| CA | 2570953 A1 | 6/2008 |
| WO | 2005/095538 A1 | 10/2005 |
| WO | 2005095755 A1 | 10/2005 |

OTHER PUBLICATIONS

Office Action issued in corresponding Eurasian Application No. 201070230/(OFE/1003/0023) dated Jun. 28, 2011 (4 pages).
Search Report issued in European Application No. 08796944.0 dated Apr. 5, 2011 (8 pages).
International Search Report issued in PCT/US2008/071740, mailed on Dec. 23, 2008, 4 pages.
Written Opinion issued in PCT/US2008/071740, mailed on Dec. 23, 2008, 7 pages.
Office Action issued in corresponding Canadian Application No. 2,694,970 dated Jan. 17, 2012 (3 pages).
Office Action issued in Australian Application No. 2008284101 dated Feb. 4, 2011 (1 page).
Communication pursuant to Article 94(3) EPC issued Sep. 12, 2012 in corresponding EP application No. 08 796 944.0 (4 pages).
Office Action issued in corresponding Eurasian Application No. 201070230/(OFE/1003/0023) dated Apr. 24, 2012 (2 pages).

*Primary Examiner* — Zakiya W Bates
(74) *Attorney, Agent, or Firm* — Osha • Liang LLP

(57) ABSTRACT

A process that includes pumping a first wellbore fluid comprising an oxidative degradable polymer into a wellbore through a subterranean formation; pumping a second wellbore fluid comprising a pH-activated oxidative breaker into the wellbore; pumping a third wellbore fluid comprising a delayed acid source into the wellbore; and allowing the delayed acid source to acidify at least a portion of the wellbore to a pH of less than 7 so as to activate the pH-activated oxidative breaker at the lower pH and degrade the oxidative degradable polymers is disclosed.

17 Claims, No Drawings

DELAYED BREAKER

BACKGROUND OF INVENTION

1. Field of the Invention

Embodiments disclosed herein relate generally to chemical breaker methods and fluids for use in breaking filter cakes from wellbores.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

One way of protecting the formation is by forming a filter cake on the surface of the subterranean formation. Filter cakes are formed when particles suspended in a wellbore fluid coat and plug the pores in the subterranean formation such that the filter cake prevents or reduce both the loss of fluids into the formation and the influx of fluids present in the formation. A number of ways of forming filter cakes are known in the art, including the use of bridging particles, cuttings created by the drilling process, polymeric additives, and precipitates. Fluid loss pills may also be used where a viscous pill comprising a polymer may be used to reduce the rate of loss of a wellbore fluid to the formation through its viscosity Upon completion of drilling, the filter cake and/or fluid loss pill may stabilize the wellbore during subsequent completion operations such as placement of a gravel pack in the wellbore. Additionally, during completion operations, when fluid loss is suspected, a fluid loss pill of polymers may be spotted into to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location.

After any completion operations have been accomplished, removal of filter cake (formed during drilling and/or completion) remaining on the sidewalls of the wellbore may be necessary. Although filter cake formation and use of fluid loss pills are essential to drilling and completion operations, the barriers can be a significant impediment to the production of hydrocarbon or other fluids from the well if, for example, the rock formation is still plugged by the barrier. Because filter cake is compact, it often adheres strongly to the formation and may not be readily or completely flushed out of the formation by fluid action alone.

The problems of efficient well clean-up, stimulation, and completion are a significant issue in all wells, and especially in open-hole horizontal well completions. The productivity of a well is somewhat dependent on effectively and efficiently removing the filter cake while minimizing the potential of water blocking, plugging, or otherwise damaging the natural flow channels of the formation, as well as those of the completion assembly.

Accordingly, there exists a continuing need for breaker fluids that effectively clean the well bore and do not inhibit the ability of the formation to produce oil or gas once the well is brought into production.

SUMMARY OF INVENTION

In one aspect, embodiments disclosed herein relate to a process that includes pumping a first wellbore fluid comprising an oxidative degradable polymer into a wellbore through a subterranean formation; pumping a second wellbore fluid comprising a pH-activated oxidative breaker into the wellbore; pumping a third wellbore fluid comprising a delayed acid source into the wellbore; and allowing the delayed acid source to acidify at least a portion of the wellbore to a pH of less than 7 so as to activate the pH-activated oxidative breaker at the lower pH and degrade the oxidative degradable polymers.

In another aspect, embodiments disclosed herein relate to a process that includes pumping a first wellbore fluid comprising oxidative degradable polymers and a pH-activated oxidative breaker into a wellbore through a subterranean formation; allowing some filtration of the first wellbore fluid into the subterranean formation to produce a filter cake comprising the oxidative degradable polymers and the pH-activated oxidative breaker; pumping a second wellbore fluid comprising a delayed acid source into the wellbore; allowing the delayed acid source to acidify the second wellbore fluid to a pH of less than 7; allowing the second wellbore fluid having a pH of less than 7 to contact the filter cake so as to lower the pH of the filter cake; and allowing the pH-activated oxidative breaker to activate at the lower pH and degrade the oxidative degradable polymers.

In yet another aspect, embodiments disclosed herein relate to a breaker fluid, that includes a base fluid; a pH-activated oxidative breaker; and a delayed acid source.

Other aspects and advantages of the invention will be apparent from the following description and the appended claims.

DETAILED DESCRIPTION

In one aspect, embodiments disclosed herein relate to chemical breaker methods and fluids used to remove filter cakes and/or viscosified fluid loss pills from wellbores. Filter cakes may be formed by adding various components to a wellbore fluid, pumping the fluid into the wellbore, and allowing the fluid to contact the desired subterranean formation. In particular, embodiments disclosed herein relate to a multi-component breaker system that may be used to degrade and remove filter cakes and/or viscosified fluid loss pills from wellbores.

As discussed above, filter cakes are formed on walls of a subterranean borehole (or along the interior of a gravel pack screen, for example) to reduce the permeability of the walls into and out of the formation (or screen). Some filter cakes are formed during the drilling stage to limit losses from the well bore and protect the formation from possible damage by fluids and solids within the well bore, while others are formed from spotted fluid loss pills to similarly reduce or prevent the influx and efflux of fluids across the formation walls. Also reducing the influx and efflux of fluids across a formation wall are fluid loss pills, which prevent such fluid movement by the pills' viscosity. Further, in gravel packing, it may be desirable to deposit a thin filter cake on the inside surface of a gravel pack screen to effectively block fluid from invading the formation.

Filter cakes and fluid loss pills are typically formed from fluids that contain polymers such as polysaccharide polymers that may be degradable by an oxidative breaker including starch derivatives, cellulose derivatives and biopolymers. Specifically, such polymers may include hydroxypropyl starch, hydroxyethyl starch, carboxymethyl starch, carboxymethyl cellulose, hydroxyethyl cellulose, hydroxypropyl cellulose, methyl cellulose, dihydroxypropyl cellulose, xanthan gum, gellan gum, welan gum, and schleroglucan gum, in addition to their derivatives thereof, and crosslinked derivatives thereof. Further, one of ordinary skill in the art would appreciate that such list is not exhaustive and that other polymers that may be degraded by oxidative breakers may be present in the filter cakes/pills to be degraded by the breaker systems of the present disclosure.

Further, various types of solids may optionally be suspended in wellbore fluids to bridge or block the pores of a subterranean formation in a filter cake. Such solids include those described in U.S. Pat. Nos. 4,561,985, 3,872,018, and 3,785,438, which are herein incorporated by reference in their entirety. For the purposes of the present disclosure, of particular interest are those solids soluble in acid solutions. Representative acid soluble bridging solids include calcium carbonate, limestone, marble, dolomite, iron carbonate, and oxide. However, other solids may be used without departing from the scope of the present disclosure. Other representative solids include water soluble and oil soluble solids as described in U.S. Pat. No. 5,783,527.

The chemical breaker systems of the present disclosure are bi- or multi-component systems, and may include at least a pH-activated oxidative breaker and a delayed acid source, such that the delayed acidification of a wellbore fluid by the delayed acid source triggers activation of the pH-activated oxidative breaker.

As used herein, the term "pH-activated oxidative breaker" refers to an oxidative breaker that has been rendered substantially inactive (i.e., does not react with a polymer to cleave bonds) by some means, and which is then activated (i.e., in a reactive state) by a change in pH. Such types of oxidative breakers which may activated by a pH change may include any one of those oxidative breakers known in the art to react with polysaccharides to reduce the viscosity of polysaccharide-thickened compositions or disrupt filter cakes. Such compounds may include peroxides (including peroxide adducts), other compounds including a peroxy bond such as persulphates, perborates, percarbonates, perphosphates, and persilicates, and other oxidizers such as hypochlorites. In a particular embodiment, a peroxide, such as magnesium peroxide, may be used in the breaker system of the present disclosure. Additional peroxides that may be used include those discussed in U.S. Pat. No. 6,861,394, which is assigned to the present assignee and herein incorporated by reference in its entirety. Further, in various embodiments, the effective concentration of the oxidant may range from about 0.5 lb/bbl to about 50 lbs/bbl, preferably from about 2 lb/bbl to about 48 lbs/bbl. However, one of ordinary skill in the art would appreciate that the amount of oxidant in a particular applicant may depend, for example, on the type (and strength) of oxidant used.

Certain embodiments of the present disclosure use oxidative breakers that have been encapsulated to render them inactive, but also pH-activatable. Thus, in a particular embodiment, the method by which the oxidant is activated involves release from the encapsulating material (for the purposes of dissolving a filter cake in a subterranean well) upon a change in pH in the down hole environment. However, in some embodiments, there may be a co-contributor to triggering activation of the oxidant, such as temperature, pressure, abrasion, etc. One skilled in the art would appreciate that such factors may be avoidably present downhole, and thus contribute to some extent, to the activation of the oxidant, but that the primary activation means, in accordance with the present disclosure is by pH activation. Prior art methods that used internal oxidative breakers (i.e., internal to the filter cake or fluid loss pill) suffer somewhat from premature release of peroxide that can degrade the filter cake and reduce the effectiveness of the polysaccharide polymers used for fluid loss and viscosifying purposes. For the purposes of the present disclosure, an encapsulated oxidative breaker is an oxidant that has a coating sufficient to control the release of oxidant until a set of conditions (e.g., sufficiently low pH) selected by the operator occurs. Some general encapsulating materials may include natural and synthetic oils, natural and synthetic polymers and enteric polymers and mixtures thereof. However, many methods of encapsulating may alternatively be used without departing from the scope of the present disclosure.

A suitable coating polymer should preferably form a film around the oxidant, and may be chosen such that the coating will remain substantially intact until the desired release conditions occur, for example, a change in pH for the purposes of filter cake removal. In a particular embodiment, the encapsulating material includes enteric polymers, which are defined for the purposes of the present disclosure, as polymers whose solubility characteristics are pH dependent. Here, this means that oxidant release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the oxidative breaker under predetermined conditions of pH or pH and temperature. For example the Glascol family of polymers are acrylic based polymers (available form Ciba Specialty Chemicals) are considered suitable enteric polymers for the present disclosure because the solubility depends upon the pH of the solution.

In an illustrative embodiment of the present disclosure, an enteric polymer may be selected as an encapsulating material that is substantially insoluble at pH values greater than about 7.5 and that is more soluble under conditions of decreasing pH. Thus, as the pH decreases in value (i.e. the solution becomes more acidic), by hydrolysis of the delayed acid source of the present disclosure, release of oxidative breaker is promoted. In a particular embodiment, the enteric polymer encapsulated oxidative breaker is combined with a wellbore fluid having a pH greater than 7.5, as described below, so as to avoid premature release of the oxidative breaker.

Further, while the above discusses the encapsulation of the oxidative breakers of the present disclosure, it is also specifically within the scope of the present disclosure that in some embodiments, an unencapsulated oxidative breaker may be used. Particularly, it is contemplated that such unencapsulated oxidative breaker may be used in wellbores having temperatures of less than 150° F. The inventors of the present disclosure have recognized that at such lower temperatures, when used in alkaline wellbore fluids, there is limited risk of early activation of the oxidative breaker. Thus, at such conditions, an unencapsulated oxidative breaker may be used without significant risk of early activation, and its oxidative nature may be triggered or activated by a reduction in pH by the delayed acid source disclosed herein.

The delayed acid source, as referred to herein, includes compounds which will release acid upon length of time. In particular, compounds that hydrolyze to form acids in situ may be utilized as a delayed acid source. Such delayed source of acidity may be provided, for example, by hydrolysis of an ester. Illustrative examples of such delayed acid sources include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

Suitable esters may include carboxylic acid esters so that the time to achieve hydrolysis is predetermined on the known downhole conditions, such as temperature and pH. In a particular embodiment, the delayed pH component may include a formic or acetic acid ester of a C2-C30 alcohol, which may be mono- or polyhydric. Other esters that may find use in activating the oxidative breaker of the present disclosure include those releasing C1-C6 carboxylic acids, including hydroxycarboxylic acids formed by the hydrolysis of lactones, such as γ-lactone and δ-lactone). In another embodiment, a hydrolyzable ester of a C1 to C6 carboxylic acid and/or a C2 to C30 poly alcohol, including alkyl orthoesters, may be used. In a particular embodiment, the delayed acid source may be provided in an amount greater than about 1 percent v/v of the wellbore fluid, and ranging from about 1 to 50 percent v/v of the wellbore fluid in yet another aspect. However, one of ordinary skill in the art would appreciate that the preferred amount may vary, for example, on the rate of hydrolysis for the particular acid source used.

It is well known in the art that temperature, as well as the presence of hydroxide ion source, has a substantial impact on the rate of hydrolysis of esters. For a given acid, for example, formic acid, one of skill in the art can conduct simple studies to determine the time to hydrolysis at a given temperature. It is also known that as the length of the alcohol portion of the ester increases, the rate of hydrolysis decreases. Thus, by systematically varying the length and branching of the alcohol portion of the ester, the rate of release of acid may be controlled, and thus the activation of the pH-activated oxidative breaker may be predetermined.

Additionally, depending on the expected downhole temperature and corresponding expected hydrolysis rate of the selected ester, it may be desirable to incorporate an enzyme, such as lipases, esterases, and proteases, into the wellbore fluid containing the ester so as to increase the rate of hydrolysis. Incorporation of such enzymes is described, for example, in U.S. Pat. No. 5,678,632, which is herein incorporated by reference in its entirety. Further, while temperatures greater than 120° F. typically do not require the incorporation of an enzyme due to sufficiently high hydrolysis rates, it is contemplated that other esters (having lower hydrolysis rates that would not generally be used) may be used in conjunction with an enzyme to increase the inherently low hydrolysis rate.

The multi-component breaker systems of the present disclosure may be used to treat a wellbore in a variety of methods. For example, the fluids and/or order in which the components are emplaced may vary depending on the particular wellbore to be treated. Specifically, the breaker may be an internal breaker, residing in the formed filter cake, or may be an external breaker and be emplaced downhole subsequent to the formation of the filter cake or spotting of a fluid loss pill.

Further, downhole conditions, including temperatures, differ according to the depth and location of the formation. The inventors of the present disclosure have discovered that it may be desirable to tailor the specific formulation of the breaker system in accordance with the downhole temperatures expected in the region of the wellbore needing cleaning. In one embodiment, a filter cake removal fluid of the present disclosure may be optimally used at lower downhole temperatures ranging from 65° F. to 150° F. for a period of time effective to degrade the polymers present in a filter cake of fluid loss pill. Additionally, another filter cake removal formulation may be optimally used at higher downhole temperatures greater than 150° F. Further, the fluids of the present disclosure may range from about 3.5 to about 48 hours or more, depending on the state of well operations.

In one embodiment, a fluid containing polysaccharide polymers and a pH-activated oxidative breaker (encapsulated or unencapsulated) is pumped into the wellbore and a filter cake is thus formed that incorporates the not-yet-activated oxidative breaker. At some period of time later, when it may be desirable to remove the filter cake, the pH-activated oxidative breaker may now be activated (either by the combination of pH and temperature or by degradation of any encapsulating material by reduced pH) by causing the downhole environment to become more acidic via hydrolysis of the delayed acid source. Again, it should be emphasized that this is merely one possible mechanism by which the oxidant release may occur in the down hole environment. Those skilled in the art will recognize that other factors, or a combination of factors, may in fact aid in the activation of the oxidant. The methods discussed here are intended to illustrate possible mechanisms by which oxidant activation may occur and are not intended to narrow the scope of the invention, as defined by the claims herein.

Alternatively, the pH-activated oxidative breaker may be in the wellbore subsequent to the formation of a filter cake or placement of a fluid loss pill containing polysaccharide polymers when the breaker is activated. That is, subsequent to formation of the filter cake or viscosified fluid loss pill, a pH-activated oxidative breaker and delayed acid source may be pumped into the wellbore at some period of time later. The delayed pH component may then undergo hydrolysis to activate the oxidative breaker. Further, depending on the choice of the engineer, the oxidative breaker and delayed acid source may be pumped into the wellbore simultaneously in the same fluid, or sequentially in different fluids (in either order). Further, in yet another alternative embodiment, the oxidative breaker and/or the delayed acid source may be pumped together with the polymers that will eventually be broken. However, if the delayed acid source is internal with filter cake or fluid loss pill, it may be desirable to reduce the loading of the delayed acid source or type of acid source so that the initial pH remained high.

In one illustrative embodiment, an encapsulated (pH-degradable) oxidant is pumped into a wellbore with polysaccharide polymers in a first wellbore fluid (e.g., in a drilling fluid or fluid loss pill). As some of the fluid permeates into the formation, a filter cake containing polysaccharide polymers and the encapsulated oxidant is formed. When it is desirable to break the formed filtercake, a second wellbore fluid containing a delayed acid-source is pumped downhole. Upon release of acid by the delayed acid source, degradation of the encapsulating material occurs, triggering activation of the previously encapsulated (inactive) oxidant. The activated oxidant may then react with the polysaccharide polymers forming the filter cake to cause degradation of the filter cake. If desirable, a wash fluid may then be subsequently circulated in the wellbore to remove the degraded filter cake material.

In another illustrative embodiment, an unencapsulated oxidant is pumped into a wellbore with polysaccharide polymers in a first wellbore fluid (e.g., in a drilling fluid or fluid loss pill). As some of the fluid permeates into the formation, a filter cake containing polysaccharide polymers and the unencapsulated oxidant is formed. When it is desirable to break the formed filtercake, a second wellbore fluid containing a delayed acid-source is pumped downhole. Upon release of acid by the delayed acid source, activation of the unencapsulated oxidant occurs such that the activated oxidant may then react with the polysaccharide polymers forming the filter cake to cause degradation of the filter cake. If desirable, a wash fluid may then be subsequently circulated in the wellbore to remove the degraded filter cake material. As described above, use of an unencapsulated oxidant may be limited to downhole conditions in which the oxidant is not otherwise as readily activatable as other potential conditions. For example, with lower downhole temperatures, i.e., lower then 150° F., premature oxidation of the polysaccharides (and thus degradation of the filter cake) is not as great a risk as with temperatures greater than 150° F.

In yet another illustrative embodiment, a first wellbore fluid (e.g., in a drilling fluid or fluid loss pill) containing polysaccharide polymers is pumped into a wellbore. As some of the fluid permeates into the formation, a filter cake containing polysaccharide polymers is formed. When it is desirable to break the formed filtercake, a second wellbore fluid containing an encapsulated oxidant is pumped downhole, followed by a third wellbore fluid containing a delayed acid-source is pumped downhole. Upon release of acid by the delayed acid source, degradation of the encapsulating material occurs, triggering activation of the previously encapsulated oxidant. The activated oxidant may then react with the polysaccharide polymers forming the filter cake to cause degradation of the filter cake. If desirable, a wash fluid may then be subsequently circulated in the wellbore to remove the degraded filter cake material. While this embodiment refers to the sequential pumping of the second and third wellbore fluids, one of ordinary skill in the art would appreciate that the order of pumping may be reversed, with the delayed acid source followed by the encapsulated oxidant.

In yet another illustrative embodiment, a first wellbore fluid (e.g., in a drilling fluid or fluid loss pill) containing polysaccharide polymers is pumped into a wellbore. As some of the fluid permeates into the formation, a filter cake containing polysaccharide polymers is formed. When it is desirable to break the formed filtercake, a second wellbore fluid containing an unencapsulated oxidant is pumped downhole, followed by a third wellbore fluid containing a delayed acid-source is pumped downhole. Upon release of acid by the delayed acid source, activation of the unencapsulated oxidant occurs such that the activated oxidant may then react with the polysaccharide polymers forming the filter cake to cause degradation of the filter cake. If desirable, a wash fluid may then be subsequently circulated in the wellbore to remove the degraded filter cake material. While this embodiment refers to the sequential pumping of the second and third wellbore fluids, one of ordinary skill in the art would appreciate that the order of pumping may be reversed, with the delayed acid source followed by the encapsulated oxidant. Additionally, one of ordinary skill in the art would also appreciate that in yet another embodiment, the second and third wellbore fluids may be combined or initially formulated as a single fluid by which the unencapsulated oxidant and delayed acid source may be pumped simultaneously into the wellbore.

The various components of the present disclosure may be provided in wellbore fluids may have an aqueous fluid as the base liquid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

So as to allow for the activation of the oxidative breaker of the present disclosure to be controllably triggered by the delayed acid source disclosed herein, and not early activation, the wellbore fluid in which the oxidative breaker is provided may have an alkaline pH, such as a pH ranging from 7 to about 12, in some embodiments. However, in embodiments in which the oxidative breaker may require an even lower pH than a pH of 7 for triggering, one of ordinary skill in the art would appreciate that a wellbore fluid having a pH of less than 7 may optionally be used, so long as the wellbore fluid's pH is above the trigger pH for the particular oxidative breaker. One of ordinary skill in the art would further appreciate that the pH of a wellbore fluid may be adjusted by methods known to those skilled in the art, including addition of buffers and/or bases to the fluid. Such bases include potassium hydroxide, sodium hydroxide, magnesium oxide, calcium hydroxide, and zinc oxide.

Additionally, so as to allow for sufficient (and controllable) delay in the release of acid to trigger oxidant activation, the wellbore fluid in which the delayed acid source is provided may optionally contain a pH buffer depending on the method chosen for a particular wellbore.

Other additives that may be included in some of the wellbore fluids disclosed herein include for example, weighting agents, wetting agents, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating wellbore fluids and muds.

EXAMPLES

Various samples of fluids were formulated and subjected to breaker tests in order to test the effectiveness of the breaker systems of the present disclosure in degrading filter cakes under simulated wellbore conditions. FLO-VIS™ PLUS, a xanthan gum, FLO-TROL®, a starch derivative, ECF-683, encapsulated magnesium peroxide, ECF-974, a hydrolysable ester of formic acid, and SAFE-CARB®, calcium carbonate, are all available from M-I LLC (Houston, Tex.). THERMO-SAL™ is a high temperature polymer stabilizer available from TBC-Brinadd (Houston, Tex.). The fluid formulations are shown below in Table 1.

TABLE 1

| PRODUCT | UNITS | 1 | 2 |
| --- | --- | --- | --- |
| Tapwater | ml/g | 165 | 165 |
| 11.6 CaCl2 | g | 230 | 230 |
| FLO-VIS ™ PLUS | g | 1.5 | 0.75 |
| KOH pH = 9 | g | 2 | 2 |
| Magox | g | x | 1 |
| FLOTROL ™ | g | 8 | 6 |
| ECF-683 | g | 1 | 1 |
| Lube-167 (1% v/v) | g | 4 | 4 |
| SAFE-CARB ™ 20 | g | 2 | 2 |
| SAFE-CARB ™ 40 | g | 24 | 26 |
| SAFE-CARB ™ 250 | g | 4 | 2 |
| SAFE-SCAV ® CA | g | 0.4 | X |
| PERIOD AGED | HOURS | 16 | 16 |
| TEMPERATURE | ° F. | 155 | 155 |
| DYNAMIC/STATIC | D/S | D | D |

Filter cakes built from the above wellbore fluids were subjected to a modified High Temperature High Pressure (HTHP) Filtration test. The HTHP Filtration test uses a HTHP cell fitted with a fitted disc as a porous medium, on which a filter cake is built. In this example, the filter cakes were built on 35 micron discs. This test was performed at 155° F. using 100 psi differential to air. Effluent was collected as shown in Table 2.

TABLE 2

| | | 1 | 2 |
| --- | --- | --- | --- |
| Breaker Test | | | |
| TEMP | ° F. | 155 | 155 |
| DELTA PRESSURE | psi | 100 | 100 |
| Filterdisk Size | microns | 35 | 35 |
| Spurt | ml | 8.2 | 6.2 |
| 1 min | ml | 8.6 | 6.8 |
| 4 min | ml | 9.5 | 8.3 |
| 9 min | ml | 10.8 | 9.2 |
| 16 min | ml | 11.6 | 11.0 |
| 25 min | ml | 12.8 | 12.8 |
| 30 min | ml | 13.2 | 13.0 |
| 4 HRS | ml | 21.0 | — |

Several breaker tests were performed to simulate clean-up of the residual filtercakes formed from the fluids in Table 1. The filtercakes formed during the fluid loss test in Table 2 were used for clean-up simulations. The filtercakes formed possess an internal breaker such that when this component is contacted by a low pH breaker fluid (i.e., less than 5) this solid reacts to form a relatively mild oxidizer. The net result is a "pin-holing" effect in the residual filtercake. The results of this test as shown residual filtercake before application, after a soak with an acid precursor for a predetermined period of time, and after a simulated flowback. The breaker fluid and results are shown in Table 3 below.

TABLE 3

| | | 1 | 2 |
| --- | --- | --- | --- |
| Breaker Fluid | | | |
| Fresh Water | ml/g | 40.67 | 40.67 |
| 11.6 CaCl2 | g | 258.16 | 258.16 |
| KOH | g | 0.05 | 0.05 |

TABLE 3-continued

| | | 1 | 2 |
| --- | --- | --- | --- |
| ECF-974 (25% v/v) | ml/g | 101 | 101 |
| EGMBE (5% v/v) | ml/g | 17 | 17 |
| Density | | 10.7 | 10.7 |
| pH | | 1.7 | 1.7 |
| Soak Time | hr | 21 | 68 |
| Breaker Test | | | |
| pH effluent | | 1.72 | 1.2 |
| breakthrough | | 2 ml 30 min | 2 ml 30 min |
| Total Soak Time | | 21 | 60 |
| Return to Flow Test | | | |
| Pressure | psi | 10 | 10 |
| Initial Flow 200 mls 3% KCl | sec | 11.45 | 12 |
| Final Flow 200 mls 3% KCl | sec | 16 | 14.82 |
| Return to Flow | % | 71.56 | 80.97 |

Example 2

Two samples of fluids (the second having a reduced amount of biopolymer) were formulated and their rheological properties monitored in order to test the effectiveness of the breaker systems of the present disclosure in degrading filter cakes and/or fluid loss pills. FLO-VIS™ PLUS, a xanthan gum, DUAL-FLO®, a modified starch derivative, EMI-530, triethanolamine, SAFE-BREAK™ MP, an encapsulated oxidative breaker, and SAFE-CARB®, calcium carbonate, are all available from M-I LLC (Houston, Tex.). X-46, granulated calcium peroxide, LUBETEX™, a lubricant, are available from TBC-Brinadd (Houston, Tex.). The fluid formulations are shown below in Table 4.

TABLE 4

| Product | Fluid 1 | Fluid 2 | Fluid 3 | Fluid 4 | Fluid 5 | Fluid 6 |
| --- | --- | --- | --- | --- | --- | --- |
| 10.8 ppg CaCl$_2$ (lb/bbl) | 415.2 | 415.2 | 415.2 | 416.6 | 416.6 | 416.6 |
| FLO-VIS ™ L (lb/bb) | 4.58 | 4.58 | 4.58 | 3.02 | 3.02 | 3.02 |
| DUAL-FLO ® (lb/bbl) | 4.0 | 4.0 | 4.0 | 4.0 | 4.0 | 4.0 |
| EMI 530 (lb/bbl) | 14.05 | 14.05 | 14.05 | 14.05 | 14.05 | 14.05 |
| X-46 | — | 5.0 | — | — | 5.0 | — |
| SAFE-BREAK ™ MP | — | — | 5.0 | — | — | 5.0 |

The fluids were built as shown above, initial and post-heat aging (static aging at 150° F. for 16 hours) properties were determined to establish a baseline. Post-heat aging properties were recorded to determine if fluid rheological properties were broken in response to the internal oxidative breakers, X-46 and SAFE-BREAK™ MP. The baseline results are shown in Tables 5A-C.

TABLE 5A

Fluids 1 & 4

| | Initial | Post-Heat Aging | | | | Initial | Post-Heat Aging | | | |
|---|---|---|---|---|---|---|---|---|---|---|
| Fluid | 1 | 1 | 1 | 1 | 1 | 4 | 4 | 4 | 4 | 4 |
| Elapsed Time | — | 16 | 40 | 64 | 88 | — | 16 | 40 | 64 | 88 |
| Fann Rheology | | | | | | | | | | |
| 600 rpm | 190 | 192 | 191 | 191 | 191 | 110 | 108 | 121 | 146 | 150 |
| 300 rpm | 132 | 140 | 139 | 140 | 139 | 80 | 78 | 101 | 113 | 110 |
| 200 rpm | 111 | 116 | 118 | 118 | 119 | 65 | 65 | 82 | 93 | 93 |
| 100 rpm | 82 | 87 | 88 | 90 | 89 | 47 | 48 | 61 | 68 | 71 |
| 6 rpm | 30 | 30 | 32 | 33 | 34 | 15 | 16 | 22 | 24 | 25 |
| 3 rpm | 24 | 24 | 25 | 26 | 27 | 12 | 13 | 17 | 19 | 20 |
| 10" (lbs/100 ft$^2$) | 22 | 23 | 23 | 24 | 26 | 12 | 13 | 16 | 17 | 17 |
| 10' (lbs/100 ft$^2$) | 26 | 28 | 28 | 28 | 30 | 23 | 22 | 21 | 20 | 20 |
| App. Visc (cP) | 95 | 96 | 95.5 | 95.5 | 95.5 | 55 | 54 | 60.5 | 73 | 75 |
| PV (cP) | 58 | 52 | 52 | 51 | 52 | 30 | 30 | 20 | 33 | 40 |
| YP (lbs/100 ft$^2$) | 74 | 88 | 87 | 89 | 87 | 50 | 48 | 81 | 80 | 70 |
| LSRV (0.0636 sec$^{-1}$) | | | | | | | | | | |
| 1 min | 67486 | 41191 | 41491 | 34395 | 30091 | 23195 | 29094 | 28594 | 19792 | 11797 |
| 2 min | 85582 | 43791 | 41491 | 35292 | 29991 | 32093 | 35292 | 33893 | 21795 | 12597 |
| 3 min | 88281 | 43791 | 41791 | 35392 | 28991 | 33093 | 36492 | 34593 | 23995 | 12597 |
| Mud Weight | 10.65 | 10.65 | 10.65 | 10.65 | 10.65 | 10.65 | 10.65 | 10.65 | 10.65 | 10.65 |
| pH | 7 | 7 | 6.86 | 6.77 | 6.68 | 7.25 | 7.21 | 7.17 | 7.11 | 6.94 |

TABLE 5B

Fluids 2 & 5

| | Initial | Post-Heat Aging | | | | Initial | Post-Heat Aging | | | |
|---|---|---|---|---|---|---|---|---|---|---|
| Fluid | 2 | 2 | 2 | 2 | 2 | 5 | 5 | 5 | 5 | 5 |
| Elapsed Time | — | 16 | 40 | 64 | 88 | — | 16 | 40 | 64 | 88 |
| Fann Rheology | | | | | | | | | | |
| 600 rpm | 145 | 54 | 33 | 29 | 25 | 120 | 24 | 20 | 20 | 12 |
| 300 rpm | 107 | 31 | 18 | 16 | 13 | 86 | 13 | 10 | 10 | 7 |
| 200 rpm | 90 | 12 | 13 | 12 | 10 | 72 | 10 | 7 | 7 | 5 |
| 100 rpm | 69 | 13 | 7 | 7 | 5 | 53 | 6 | 5 | 3 | 3 |
| 6 rpm | 27 | 1 | 1 | 1 | 1 | 18 | 2 | 0 | 2 | 1 |
| 3 rpm | 23 | 1 | 1 | 1 | 1 | 14 | 1 | 0 | 1 | 0 |
| 10" (lbs/100 ft$^2$) | 25 | 1 | 1 | 1 | 1 | 15 | 1 | 0 | 1 | 0 |
| 10' (lbs/100 ft$^2$) | 45 | 1 | 3 | 1 | 1 | 32 | 1 | 1 | 2 | 0 |
| App. Visc (cP) | 72.5 | 27 | 16.5 | 14.5 | 12.5 | 60 | 12 | 10 | 10 | 6 |
| PV (cP) | 38 | 23 | 15 | 13 | 12 | 34 | 11 | 10 | 10 | 5 |
| YP (lbs/100 ft$^2$) | 69 | 8 | 3 | 3 | 1 | 52 | 2 | 0 | 0 | 2 |
| LSRV (0.0636 sec$^{-1}$) | | | | | | | | | | |
| 1 min | 58987 | — | — | — | — | 35692 | 299 | 899.9 | — | 100 |
| 2 min | 95480 | — | — | — | — | 45890 | 200 | 999.8 | — | 200 |
| 3 min | — | — | — | — | — | 46290 | 100 | 1200 | — | 200 |
| Mud Weight | 10.65 | 10.65 | 10.65 | 10.65 | 10.65 | 10.65 | 10.65 | 10.65 | 10.65 | 10.65 |
| pH | 7.11 | 7.76 | 8.29 | 8.33 | 8.41 | 7.63 | 8.42 | 8.31 | 8.58 | 8.39 |

TABLE 5C

Fluids 3 & 6

| | Initial | Post-Heat Aging | | | | Initial | Post-Heat Aging | | | |
|---|---|---|---|---|---|---|---|---|---|---|
| Fluid | 3 | 3 | 3 | 3 | 3 | 6 | 6 | 6 | 6 | 6 |
| Elapsed Time | — | 16 | 40 | 64 | 88 | — | 16 | 40 | 64 | 88 |
| Fann Rheology | | | | | | | | | | |
| 600 rpm | 195 | 205 | 186 | 190 | 192 | 110 | 93 | 85 | 98 | 100 |
| 300 rpm | 137 | 146 | 135 | 139 | 143 | 79 | 65 | 60 | 70 | 71 |
| 200 rpm | 116 | 125 | 117 | 119 | 122 | 65 | 54 | 50 | 58 | 60 |
| 100 rpm | 97 | 95 | 90 | 91 | 95 | 49 | 40 | 35 | 43 | 43 |
| 6 rpm | 26 | 36 | 35 | 37 | 41 | 17 | 11 | 10 | 12 | 12 |
| 3 rpm | 19 | 29 | 28 | 30 | 35 | 14 | 8 | 7 | 9 | 9 |

TABLE 5C-continued

Fluids 3 & 6

| Fluid | Initial 3 | Post-Heat Aging 3 | 3 | 3 | 3 | Initial 6 | Post-Heat Aging 6 | 6 | 6 | 6 |
|---|---|---|---|---|---|---|---|---|---|---|
| 10" (lbs/100 ft$^2$) | 17 | 27 | 30 | 26 | 30 | 15 | 8 | 7 | 8 | 8 |
| 10' (lbs/100 ft$^2$) | 25 | 34 | 31 | 30 | 33 | 30 | 13 | 9 | 10 | 10 |
| App. Visc (cP) | 97.5 | 102.5 | 93 | 95 | 96 | 55 | 46.5 | 42.5 | 49 | 50 |
| PV (cP) | 58 | 59 | 51 | 51 | 49 | 31 | 28 | 28 | 28 | 29 |
| YP (lbs/100 ft$^2$) | 79 | 87 | 84 | 88 | 94 | 48 | 37 | 37 | 42 | 42 |
| LSRV (0.0636 sec$^{-1}$) | | | | | | | | | | |
| 1 min | 58293 | 67785 | 46490 | 71385 | 73199 | 58293 | 8598 | 8198 | 10098 | 8598 |
| 2 min | 69593 | 75184 | 52589 | 78983 | 75899 | 69593 | 12197 | 10598 | 10598 | 10898 |
| 3 min | 70493 | 76284 | 54289 | 79283 | 76299 | 70493 | 12597 | 11198 | 11897 | 11698 |
| Mud Weight | 10.65 | 10.65 | 10.65 | 10.65 | 10.65 | 10.65 | 10.65 | 10.65 | 10.65 | 10.65 |
| pH | 7.25 | 7.33 | 7.11 | 7.31 | 7.46 | 7.37 | 7.48 | 7.24 | 7.41 | 7.06 |

To each of fluids 1-3 and fluids 4-6, ECF-974 and acetic acid were added, respectively, to lower the pH of the fluid to a pH of 4. Post-heat aging (static aging at 150° F. for 16 hours) properties were measure to evaluate the effect of the acids on the polymer breaking. The results are shown in Tables 6A-C.

TABLE 6A

| Fluid | Initial 1 | Post-Heat Aging 1 | 1 | 1 | 1 | Initial 4 | Post-Heat Aging 4 | 4 | 4 | 4 |
|---|---|---|---|---|---|---|---|---|---|---|
| Elapsed Time | — | 16 | 40 | 64 | 88 | — | 16 | 40 | 64 | 88 |
| Fann Rheology | | | | | | | | | | |
| 600 rpm | — | 106 | 95 | 86 | 80 | 112 | 107 | 113 | 116 | 125 |
| 300 rpm | — | 73 | 66 | 60 | 58 | 80 | 76 | 82 | 84 | 90 |
| 200 rpm | — | 59 | 53 | 49 | 43 | 66 | 63 | 68 | 70 | 75 |
| 100 rpm | — | 42 | 38 | 35 | 30 | 48 | 46 | 50 | 52 | 55 |
| 6 rpm | — | 12 | 12 | 12 | 9 | 16 | 16 | 18 | 18 | 20 |
| 3 rpm | — | 8 | 9 | 9 | 7 | 12 | 13 | 14 | 14 | 15 |
| 10" (lbs/100 ft$^2$) | — | 10 | 10 | 11 | 10 | 13 | 15 | 12 | 14 | 14 |
| 10' (lbs/100 ft$^2$) | — | 12 | 11 | 11 | 11 | 31 | 27 | 26 | 22 | 23 |
| App. Visc (cP) | — | 53 | 47.5 | 43 | 40 | 56 | 53.5 | 56.5 | 58 | 62.5 |
| PV (cP) | — | 33 | 29 | 26 | 22 | 32 | 31 | 31 | 32 | 35 |
| YP (lbs/100 ft$^2$) | — | 40 | 37 | 34 | 36 | 48 | 45 | 51 | 52 | 55 |
| LSRV (0.0636 sec$^{-1}$) | | | | | | | | | | |
| 1 min | — | 11698 | 8898 | 9798 | 10021 | 31393 | 2495 | 24495 | 26894 | 20096 |
| 2 min | — | 12297 | 9498 | 9998 | 10121 | 46290 | 34293 | 28394 | 30294 | 22596 |
| 3 min | — | 12597 | 9898 | 10098 | 10000 | 48790 | 35293 | 28794 | 31593 | 22895 |
| Mud Weight | 10.65 | 10.69 | 10.69 | 10.69 | 10.69 | 10.65 | 10.69 | 10.69 | 10.69 | 10.69 |
| pH | 3 | 1.26 | 1.19 | 1.17 | 1.1 | 4.12 | 4.22 | 4.46 | 4.57 | 4.62 |

TABLE 6B

| Fluid | Initial 2 | Post-Heat Aging 2 | 2 | 2 | 2 | Initial 5 | Post-Heat Aging 5 | 5 | 5 | 5 |
|---|---|---|---|---|---|---|---|---|---|---|
| Elapsed Time | — | 16 | 40 | 64 | 88 | — | 16 | 40 | 64 | 88 |
| Fann Rheology | | | | | | | | | | |
| 600 rpm | — | 166 | 15057 | 158 | 160 | 109 | 78 | 75 | 75 | 59 |
| 300 rpm | — | 116 | 11180 | 110 | 112 | 84 | 54 | 50 | 52 | 38 |
| 200 rpm | — | 94 | 90 | 90 | 93 | 68 | 44 | 39 | 42 | 30 |
| 100 rpm | — | 68 | 65 | 66 | 70 | 50 | 30 | 27 | 29 | 20 |
| 6 rpm | — | 22 | 21 | 22 | 28 | 18 | 7 | 6 | 5 | 3 |
| 3 rpm | — | 17 | 17 | 17 | 20 | 15 | 5 | 3 | 4 | 2 |
| 10" (lbs/100 ft$^2$) | — | 16 | 18 | 16 | 15 | 15 | 6 | 3 | 4 | 2 |
| 10' (lbs/100 ft$^2$) | — | 22 | 22 | 21 | 23 | 29 | 6 | 4 | 6 | 3 |
| App. Visc (cP) | — | 83 | 78.5 | 79 | 80 | 54.5 | 39 | 37.5 | 37.5 | 29.5 |
| PV (cP) | — | 50 | 47 | 48 | 48 | 25 | 24 | 25 | 23 | 21 |
| YP (lbs/100 ft$^2$) | — | 66 | 63 | 62 | 64 | 59 | 30 | 25 | 29 | 17 |
| LSRV (0.0636 sec$^{-1}$) | | | | | | | | | | |
| 1 min | — | 23694 | 28194 | 25195 | 22758 | 37192 | 499 | 299.9 | 200 | 699 |
| 2 min | — | 29294 | 30394 | 27794 | 23798 | 51089 | 1300 | 299.9 | 399.9 | 599.8 |

TABLE 6B-continued

|  | Initial | Post-Heat Aging | | | | Initial | Post-Heat Aging | | | |
|---|---|---|---|---|---|---|---|---|---|---|
| Fluid | 2 | 2 | 2 | 2 | 2 | 5 | 5 | 5 | 5 | 5 |
| 3 min | — | 30593 | 31193 | 29894 | 25891 | 52989 | 1400 | 299.9 | 799.9 | 599.8 |
| Mud Weight | 10.69 | 10.69 | 10.69 | 10.69 | 10.69 | 10.69 | 10.69 | 10.69 | 10.69 | 10.69 |
| pH | 3.5 | 3.48 | 3.54 | 3.78 | 4.22 | 5.6 | 5.32 | 7.63 | 7.54 | 7.65 |

TABLE 6C

|  | Initial | Post-Heat Aging | | | | Initial | Post-Heat Aging | | | |
|---|---|---|---|---|---|---|---|---|---|---|
| Fluid | 3 | 3 | 3 | 3 | 3 | 6 | 6 | 6 | 6 | 6 |
| Elapsed Time | — | 16 | 40 | 64 | 88 | — | 16 | 40 | 64 | 88 |
| Fann Rheology | | | | | | | | | | |
| 600 rpm | — | 140 | 146 | 129 | 122 | 102 | 100 | 97 | 110 | 79 |
| 300 rpm | — | 100 | 104 | 91 | 85 | 74 | 70 | 69 | 78 | 57 |
| 200 rpm | — | 82 | 85 | 76 | 68 | 62 | 59 | 57 | 64 | 47 |
| 100 rpm | — | 60 | 61 | 55 | 43 | 45 | 42 | 41 | 46 | 35 |
| 6 rpm | — | 17 | 17 | 15 | 10 | 15 | 12 | 12 | 13 | 10 |
| 3 rpm | — | 12 | 12 | 10 | 8 | 12 | 9 | 10 | 10 | 7 |
| 10" (lbs/100 ft$^2$) | — | 12 | 12 | 10 | 7 | 13 | 9 | 8 | 10 | 6 |
| 10' (lbs/100 ft$^2$) | — | 16 | 15 | 12 | 10 | 22 | 15 | 11 | 12 | 8 |
| App. Visc (cP) | — | 70 | 73 | 64.5 | 61 | 51 | 5- | 48.5 | 55 | 39.5 |
| PV (cP) | — | 40 | 42 | 38 | 37 | 28 | 30 | 28 | 32 | 22 |
| YP (lbs/100 ft$^2$) | — | 60 | 62 | 53 | 48 | 46 | 40 | 41 | 46 | 35 |
| LSRV (0.0636 sec$^{-1}$) | | | | | | | | | | |
| 1 min | — | 17796 | 15897 | 13497 | 10497 | 32393 | 13097 | 29894 | 17796 | 21195 |
| 2 min | — | 18696 | 16496 | 14697 | 11697 | 44590 | 17396 | 35392 | 20196 | 24095 |
| 3 min | — | 19098 | 16596 | 15297 | 12297 | 49589 | 18796 | 36692 | 23295 | 24395 |
| Mud Weight | 10.69 | 10.69 | 10.69 | 10.69 | 10.69 | 10.69 | 10.69 | 10.69 | 10.69 | 10.69 |
| pH | 4 | 4.51 | 4.64 | 4.8 | 5.31 | 5.37 | 7.26 | 7.22 | 7.42 | 7.27 |

Advantageously, embodiments of the present disclosure provide for the controllable removal and clean-up of a filter-cake or fluid loss pill formed during drilling or completion operations by using a delayed acid source. Additionally, because the delayed acid source is formed produces acid slowly in situ, the pH is never as low as would be the case if an aqueous solution of acid were pumped downhole, thus reducing potential damage to the formation, labor costs, etc. Further, as the activation of the oxidative breaker (and breaking of the polymers) is triggered by the delayed acid source, more control in the breakdown and removal/clean-up of filter cakes and fluid loss pills may be achieved than in conventional breaker systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A process comprising:
   pumping a first wellbore fluid comprising an oxidative degradable polymer into a wellbore through a subterranean formation;
   pumping a second wellbore fluid comprising a pH-activated oxidative breaker into the wellbore;
   pumping a third wellbore fluid comprising a delayed acid source into the wellbore; and
   allowing the delayed acid source to acidify at least a portion of the wellbore to a pH of less than 7 so as to activate the pH-activated oxidative breaker at the lower pH and degrade the oxidative degradable polymers, wherein the delayed acid source consists essentially of one or more formic or acetic acid esters of $C_2$-$C_{30}$ alcohols.

2. The process of claim 1, wherein the first wellbore fluid and the second wellbore fluid are pumped as a single fluid.

3. The process of claim 1, wherein the second wellbore fluid and the third wellbore fluid are pumped as a single fluid.

4. The process of claim 1, wherein the first wellbore fluid, second wellbore fluid, and third wellbore fluid are pumped as a single fluid.

5. The process of claim 1, wherein the pH-activated oxidative breaker is encapsulated by an enteric polymer.

6. The process of claim 1, wherein the third wellbore fluid comprises a pH buffer.

7. The process of claim 1, wherein the delayed acid source acidifies at least a portion of the wellbore to a pH of less than 5 so as to activate the pH-activated oxidative breaker at the lower pH and degrade the oxidative degradable polymers.

8. The process of claim 1, further comprising:
   allowing some filtration of the first wellbore fluid into the subterranean formation to produce a filter cake comprising the oxidative degradable polymers.

9. The process of claim 1, wherein a temperature of the wellbore is greater than 150° F.

10. The process of claim 1, wherein a temperature of the wellbore is at most 150° F.

11. The process of claim 1, wherein the oxidative degradable polymers and a pH-activated oxidative breaker are pumped together and allowed to produce a filter cake comprising the oxidative degradable polymers and the pH-activated oxidative breaker.

12. A process comprising:

pumping a first wellbore fluid comprising oxidative degradable polymers and a pH-activated oxidative breaker into a wellbore through a subterranean formation;

allowing some filtration of the first wellbore fluid into the subterranean formation to produce a filter cake comprising the oxidative degradable polymers and the pH-activated oxidative breaker;

pumping a second wellbore fluid comprising a delayed acid source into the wellbore, wherein the delayed acid source consists essentially of one or more formic or acetic acid esters of C2-C30 alcohols;

allowing the delayed acid source to acidify the second wellbore fluid to a pH of less than 7;

allowing the second wellbore fluid having a pH of less than 7 to contact the filter cake so as to lower the pH of the filter cake; and allowing the pH-activated oxidative breaker to activate at the lower pH and degrade the oxidative degradable polymers.

13. The process of claim 12, wherein the pH-activated oxidative breaker is encapsulated by an enteric polymer.

14. The process of claim 13, wherein a temperature of the wellbore is greater than 150° F.

15. The process of claim 13, wherein a temperature of the wellbore is at most 150° F.

16. The process of claim 12, wherein the second wellbore fluid comprises a pH buffer.

17. The process of claim 12, wherein the delayed acid source acidifies at least a portion of the wellbore to a pH of less than 5 so as to activate the pH-activated oxidative breaker at the lower pH and degrade the oxidative degradable polymers.

\* \* \* \* \*